United States Patent [19]
Kadi et al.

[11] Patent Number: 5,470,274
[45] Date of Patent: Nov. 28, 1995

[54] DEVICE FOR CLASSIFYING CARCASSES OF LARGE CATTLE, CALVES, HOGS OR SHEEP

[75] Inventors: Rachid Kadi, Champigny Sur Marne; Jean Leclere, Creteil; Janusz Plusa, Sucy En Brie, all of France

[73] Assignee: Normaclass R.D., Paris, France

[21] Appl. No.: 265,802

[22] Filed: Jun. 27, 1994

[30] Foreign Application Priority Data

Jul. 9, 1993 [FR] France .................................. 93 08727

[51] Int. Cl.⁶ ............................ A22C 17/00; B07C 5/342
[52] U.S. Cl. ......................... 452/184; 452/158; 452/181; 209/558; 209/581
[58] Field of Search ................................... 452/184, 181, 452/158, 157; 209/558, 518, 581

[56] References Cited

U.S. PATENT DOCUMENTS

| | | | |
|---|---|---|---|
| 4,645,080 | 2/1987 | Scopatz | 209/558 |
| 4,939,574 | 7/1990 | Petersen et al. | 358/93 |
| 5,133,687 | 7/1992 | Malloy | 452/149 |
| 5,194,036 | 3/1993 | Chevatier et al. | 452/198 |
| 5,326,311 | 7/1994 | Pearson et al. | 452/184 |
| 5,335,790 | 8/1994 | Geiger et al. | 209/518 |
| 5,339,963 | 8/1994 | Tao | 209/581 |

FOREIGN PATENT DOCUMENTS

| | | |
|---|---|---|
| 6764 | 9/1903 | Denmark . |
| 0321981 | 6/1989 | European Pat. Off. . |
| 2462205 | 7/1979 | France . |
| 2488530 | 8/1980 | France . |
| 2608899 | 7/1988 | France . |
| 2672775 | 8/1992 | France . |
| 3049589 | 7/1982 | Germany . |

*Primary Examiner*—Willis Little
*Attorney, Agent, or Firm*—Oliff & Berridge

[57] ABSTRACT

Device of the type including a system against which a side of meat suspended from the conveyor of a slaughterhouse line bears, capable of orientating the side of meat about its hanging point, a system for taking shots which is located on one side of the conveyor, a luminous or contrasting background situated facing the system for taking shots, on the other side of the conveyor, a system for processing the shots and a control system. The system against which each side of meat bears includes a vertical post, the axis of which passes through the axis of the hook of the conveyor, this post being driven in terms of rotation by a gear motor unit and associated with a mechanism for indexing its angular position, the post having, diametrically opposite each other, two series of bearing limit stops for a side of meat, each limit stop including a support fixed to the post used for mounting a horizontal bar forming the limit stop proper.

17 Claims, 7 Drawing Sheets

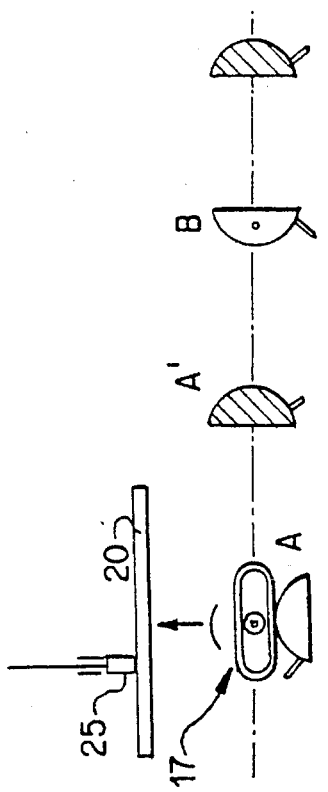
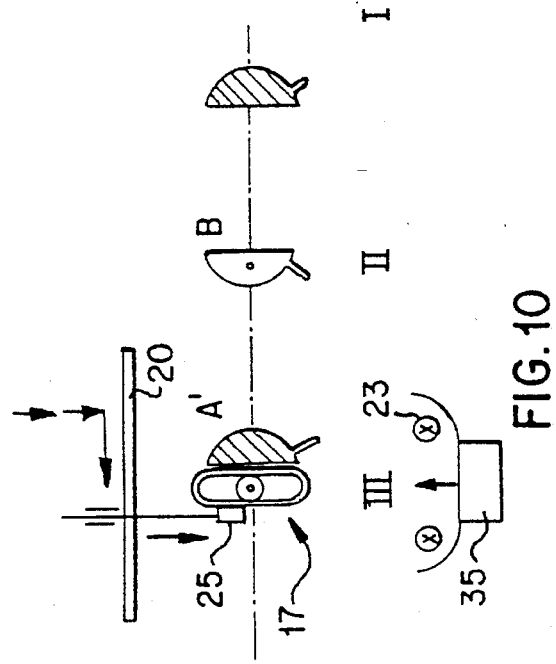
FIG. 7   FIG. 8
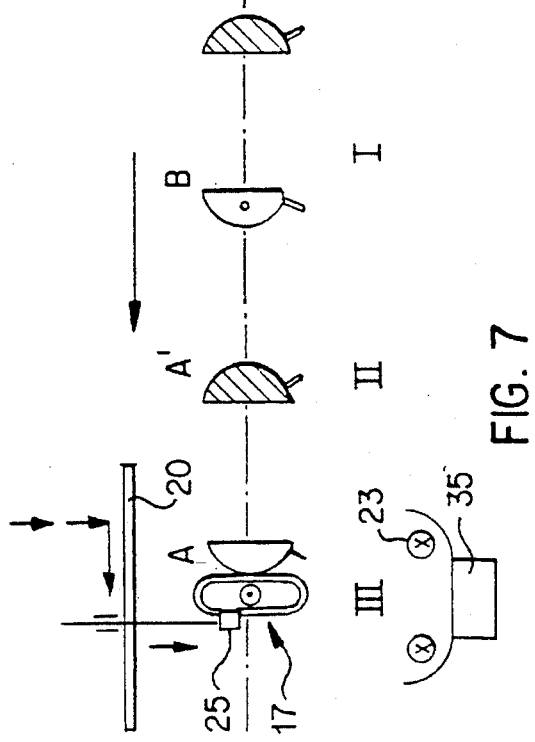
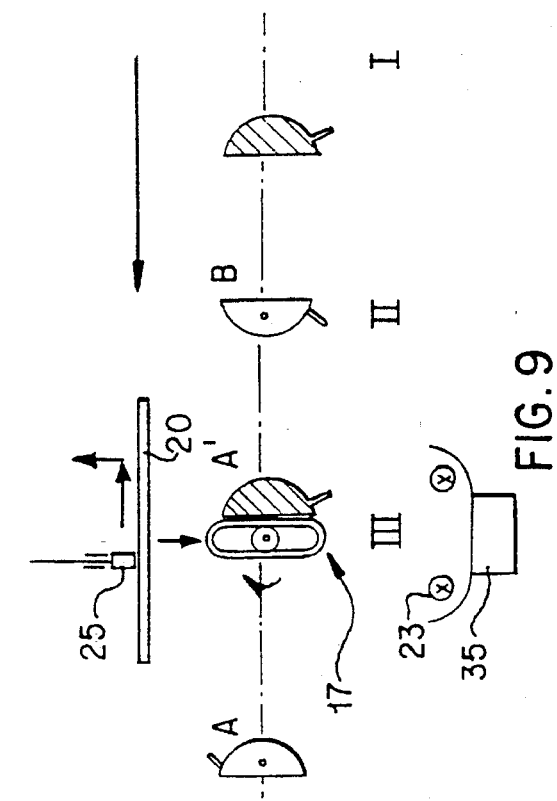
FIG. 9   FIG. 10

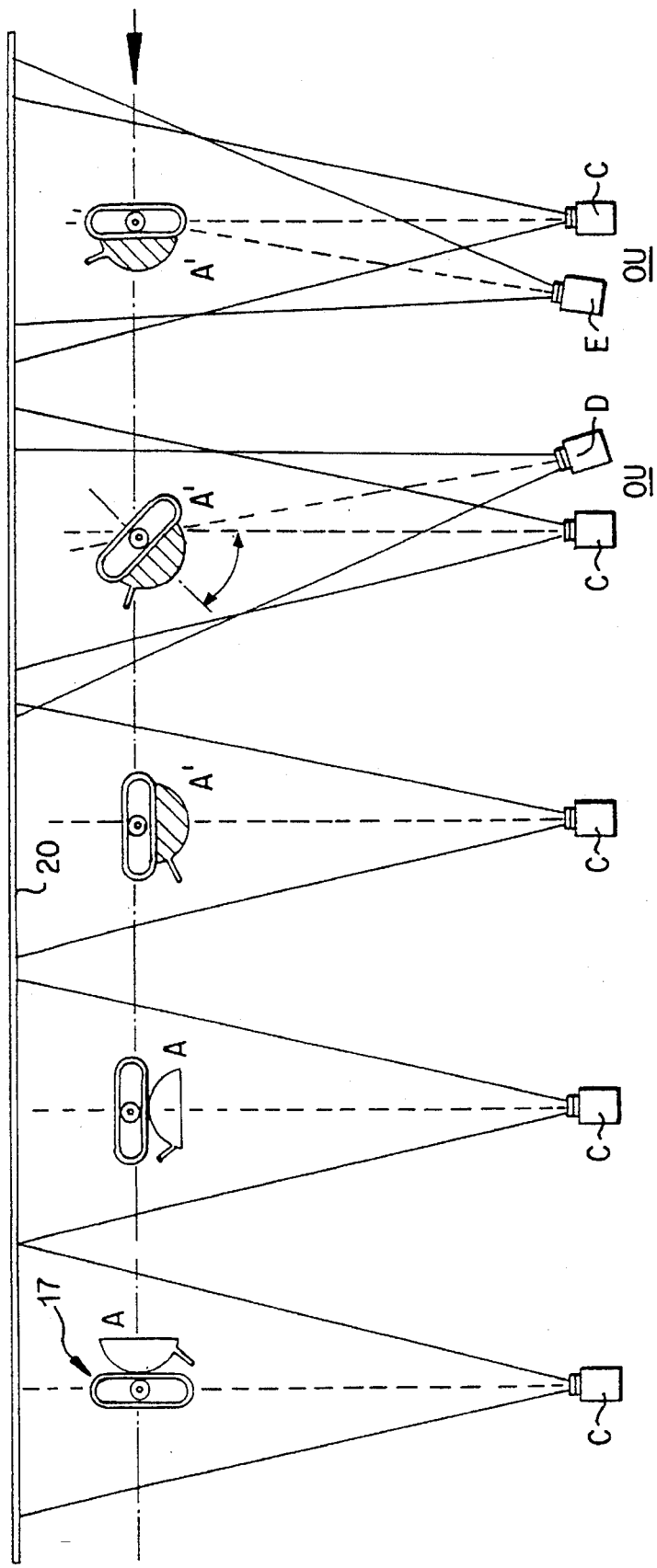

1

DEVICE FOR CLASSIFYING CARCASSES OF LARGE CATTLE, CALVES, HOGS OR SHEEP

The subject of the present invention is a device for classifying carcasses of large cattle, calves, hogs or sheep.

BACKGROUND OF THE INVENTION

There are important differences as regards the morphology and finish of the animals of one and the same species. It is therefore appropriate, after the animals have been slaughtered, to carry out classification of the carcasses in order to determine, as a function of the quality of each of them, on the one hand, the price which will be paid therefor to the rearer upstream and, on the other hand, the use which will be made thereof, downstream.

Classification comes into play at the end of the slaughterhouse lines, that is to say after evisceration and dressing of the animals, on whole carcasses (calves, sheep) or on sides of meat (large cattle, hogs) hanging from a slaughterhouse line advancing continuously or stepwise.

In the case of large cattle, two independent criteria have been adopted in order to carry out classification of the carcasses: conformation and finish. A communal descriptive scorecard, based on the visual appreciation of these two criteria has been officially recognized particularly by the EEC regulations of 28 Apr. 1981 and 12 Oct. 1981.

Conformation takes account of the quality of meat present on the carcass, as a function of the dimensions of the latter. The conformation is determined by the appreciation of the shapes and thicknesses of muscles. Five classes have been defined, each being characterized by one of the letters of the word EUROP. The quality of the conformation decreases from the class E, which corresponds to a carcass of excellent conformation with convex profiles and excellent muscle development, right down to the class P which corresponds to a mediocre conformation, with concave profiles and very little muscle development.

The finish can be appreciated by examining the external covering fat and the fat present on the internal face of the sides of meat inside the rib cage. Five classes have been defined, each being characterized by a numeral from 1 for a "very thin" fat cover, to 5 for a "very thick" fat cover.

Each class of conformation and of finish may be subdivided into 3 sub-classes (+, =, −) in order to improve the accuracy of the classification.

DESCRIPTION OF THE PRIOR ART

Currently, the classification of carcasses is carried out by operators who look at each carcass and assign a conformation class or sub-class as well as a finish class or sub-class to it. It should, however, be appreciated that this method of classification, although it refers to an official scorecard, exhibits a subjective nature because it depends solely on the visual appreciation made by an operator subjected to variable working conditions. This leads to variations in the classification of one and the same carcass by different operators and in different slaughterhouses.

In order to overcome these drawbacks, it has been envisaged to use apparatus capable of providing a classification, still according to the EUROP communal scorecard, which is less subjective and above all uniform over time and over various slaughterhouse sites.

For this purpose, it was envisaged to take measurements mechanically. The solution described in the French Patents by AUGE (79 19310, 80 17947), which is limited to the appreciation of the classification in terms of conformation, does not give satisfaction owing to the fact that it is necessary to immobilize each carcass to be classified, bring a certain number of measuring elements, such as feelers, into contact with it, to read the measurements and finally to release this carcass from the measuring members, which may be a hinderance in following high throughput rates.

Devices also exist making it possible to measure the finish, employing a probe which is to be pushed into the tissues at defined points on the carcass and which gives a measurement of the thicknesses of fat and muscle through which the probe has passed (FAT-O-METER of SKF, HENNESSY). Manual implementation is costly and is incompatible with high throughput rates. Automatic implementation is difficult to achieve given that not all carcasses are the same size, and that they are advancing along the slaughterhouse line.

There are classification devices using the analysis of video pictures (PFISTER-SKG; PETERSEN, Danish Patent Application 6764/87) which make it possible to give a classification in terms of conformation by analyzing the contour of some parts of the carcass, and a classification in terms of finish by analyzing the contrast observed between fat and muscle. This device which was designed with hogs in mind, to give an estimation of meat yield does not give satisfactory results in comparison with the true measurement of yield. With the large cattle (Danish Patent), the carcass of which is more complex than that of the hog, the device used in the form of a booth containing a single camera does not make it possible to give a classification according to the EUROP communal scorecard system with sufficient accuracy and requires a manual probe to be used in order to supplement the video measurements.

French Patent 2 672 775 in the name of the Applicant Company provides a method and a device making it possible to achieve, in a way which is automatic and by implementation of measurement means which do not come into physical contact with the carcasses, the classification of animal carcasses, directly on the slaughterhouse line, this classification being produced in terms of conformation and in terms of finish.

This method consists in stabilizing a side of meat when the transport line of the sides of meat halts, in achieving angular positioning of the carcass by pivoting about the point from which it is hung, in order to take optical shots at various angles, at the hindquarters, the leg, the top of the loin, and the front part of the side of meat corresponding to the bottom area of the latter, in storing the shots in the memory of a computer which takes into account, at the previous halting point and during transfer, the measurements of the weight and length of the side of meat, in releasing the latter from the surfaces against which it is bearing, then in processing the information acquired, taking account of basic information in order to classify the carcass.

The basic information results from the synthesis of information gathered beforehand in great quantities and processed statistically with respect to the EUROP reference classification, which makes it possible to determine the classification of each carcass with respect to the EUROP scorecard, in a perfectly faithful fashion.

A device for the implementation of this method comprises a system against which the side of meat can bear, the system being in the form of a dihedron bounded by two surfaces separated from one another by a substantially vertical ridge, one of the faces of the dihedron being intended to bear against the cut (internal) face of the side of meat, and the other face of the dihedron being intended to bear against the external face of the side of meat, in proximity to the lower part of the latter, the dihedron being mounted so that it pivots about a vertical axis, and being mounted so that it can be retracted in order to allow, when a side of meat arrives, this side of meat to be placed in contact with the dihedron then, after the shots have been taken, the side of meat to escape with respect to the dihedron in order to allow this side of meat to continue its journey along the slaughterhouse line.

In practice, the face of the dihedron against which the side of meat bears is orientated parallel to the line providing the movement of the sides of meat. This results in the need for ample guidance of the sides of meat upstream of the dihedron, for example with the aid of a belt, in order to avoid the risks of the side of meat toppling over and passing behind the dihedron. Furthermore, the method and the device which are described in this patent carry out measurement on one side of meat, and not on both sides of meat of one and the same carcass, because the measurements are carried out by bearing against a dihedron located laterally to the transport line and which can therefore relate solely to sides of meat having a given orientation. Now, there is a variability in characteristics between the two sides of meat of one and the same carcass, it being possible in some cases for the variability to lead to a difference in classification of a class. There is also a significant variability between the various quarters of a side of meat. Finally, there are problems connected with reflections in the lighting, which can distort the measurement.

It therefore seemed advantageous to be able to take measurements on both sides of meat of one and the same carcass.

SUMMARY OF THE INVENTION

The object of the invention is to provide a device implementing the general method defined in French Patent 2 672 775, allowing a throughput of 150 carcasses per hour, classifying the carcasses on the basis of data taken from just one or both of the sides of meat, this device being of a simple structure, reliable operation, and meeting all the hygiene standards required in the agri-foodstuff industrial sector.

To this end, the device to which it refers, of the type comprising a system against which a side of meat suspended from the conveyor of a slaughterhouse line bears, capable of orientating the side of meat about its hanging point, a system for taking shots which is located on one side of the conveyor, a luminous or contrasting background situated facing the system for taking shots, on the other side of the conveyor, a system for processing the shots and a control system, is one wherein the system against which each side of meat bears comprises a vertical post, the axis of which passes through the axis of the hook of the conveyor, this post being driven in terms of rotation by a gear motor unit and associated with a mechanism for indexing its angular position, the post having, diametrically opposite each other, two series of bearing limit stops for a side of meat, each limit stop including a support fixed to the post used for mounting a horizontal bar forming the limit stop proper.

In the starting position, the post is in an angular position such that the two series of limit stops are perpendicular to the axis of the conveyor. A first side of meat therefore arrives bearing against the limit stops situated upstream in the direction of travel of the conveyor. The post then pivots in order to bring the side of meat into various angular positions ensuring various shots, it being possible for these shots to be identical for each of the two sides of meat of one and the same carcass or different from one side of meat to the other, in order to seek a complementary nature between the measurements taken from the two sides of meat of one and the same carcass.

The evacuation of the carcass in contact with the limit stops takes place after the post has pivoted through an angle of 180°. It is of interest to note that when a carcass is evacuated, the other series of limit stops can be found in the standby position in order to receive the next side of meat.

According to one feature of the invention, the supports for the limit stops situated on one and the same side of the post are of variable thickness, the uppermost limit stop being situated closer to the post than the lowermost limit stop, these various limit stops defining a plane which is inclined downward from the post toward the outside of the latter.

The side of meat can therefore be found in a slightly inclined position, which ensures that it bears amply on the limit stops.

In order to adapt itself to the classification of animals of different sizes, the limit stop supports are mounted on the post so that they can be adjusted vertically.

Advantageously, at least some of the bars forming limit stops are made up of two sections articulated about a vertical axis midway along the bar and associated with a motorizing system allowing them to pivot between a position in which the bar is straight and a position in which the bar forms a V.

It is beneficial to implement this latter feature when the surface which comes to bear against the limit stops is that opposite the cut face.

According to another feature of the invention, the assembly including the vertical post and its drive system is mounted on a chassis fixed in a removable fashion to a support structure sealed into the ground.

This arrangement makes it possible, if need be, to move the assembly including the column in order to free the passage under the device for transferring sides of meat, when the device is not operating, for example in order to carry out maintenance thereon.

According to one embodiment, this device comprises a background made up of a panel of light color lit by lamps mounted behind covers located along the panel.

According to another embodiment, this device comprises a background made up of a panel of dark color lit from the outside by lamps situated on the same side as the cameras for taking shots.

The panel forming the background may be made up of a continuous surface or by several superimposed surfaces which are parallel and inclined with respect to the vertical, and possibly positioned with an angle with respect to the slaughterhouse line so that they are located as orthogonally as possible with respect to the cameras. These latter two arrangements make it possible to avoid or limit parasitic reflections on the cameras.

Advantageously, the panel forming a luminous or contrasting background comprises an opening, possibly one which can be closed off, intended to allow a system for washing the limit stops to pass through it.

In this case, the device according to the invention comprises a system for washing the limit stops, having as many washing heads as there are limit stops on one side of the post, these heads being mounted offset vertically on one and the same support, which can itself move transversely to the conveyor so that each head travels along a limit stop which is situated, with respect to the post, on the opposite side from the side by which the sides of meat arrive, each head being equipped with three nozzles which, being axially offset and used respectively for supplying hot water, steam and air, are housed inside a longitudinally slit tubular casing intended to engage over a limit stop during the cleaning of the latter.

Since washing is carried out at the limit stops situated downstream in the direction of travel of the conveyor, this washing is performed in masked time, when a side of meat is being brought into contact with the series of limit stops located upstream. This cleaning during each cycle ensures perfect hygiene without the use of special cleaning products requiring a drying time which is incompatible with the throughput rates to be respected.

According to one implementational mode, the hot water is at a temperature of 50° C. to 90° C. at a pressure of 3 bar, the steam is at 140° C. at a pressure of 3 bar, and the air is at a pressure of 6 bar. The steam may advantageously be used as a direct mixture with the hot water in the event of the temperature of the latter being too low.

Advantageously, the mechanism for controlling the supply of the nozzles supplies, during the "outward" travel of each head, the steam nozzle, the hot water nozzle and possibly the air nozzle, and during the "return" travel of this head supplies the hot water nozzle, the steam nozzle and the air nozzle.

According to a simple embodiment, the support for the washing heads is mounted guided in terms of translation on horizontal posts and capable of being moved with the aid of a pneumatic ram.

In accordance with another feature of the invention, the cameras for taking shots are located inside a cabinet including a structure used for mounting camera supports, this cabinet being equipped with a door provided with transparent windows facing the cameras, containing a heating system and possibly an air conditioner.

Furthermore, the device according to the invention includes means for checking the positioning of the sides of meat at the entrance to the assembly for taking shots, means for indexing the conveyor of the sides of meat ensuring accurate positioning of each side of meat at the station for taking shots, and for detecting the presence of the sides of meat at each station.

BRIEF DESCRIPTION OF THE DRAWINGS

In any case, the invention will be clearly understood with the aid of the description which follows, with reference to the appended diagrammatic drawing which represents, by way of nonlimiting example, one embodiment of this device:

FIGS. 7 to 14 are eight views illustrating an operating cycle of the device;

FIG. 15 is a view representing the operation of the various cameras during the cycle defined with reference to FIGS. 7 to 14.

DESCRIPTION OF THE PREFERRED EMBODIMENT

Figure 1:
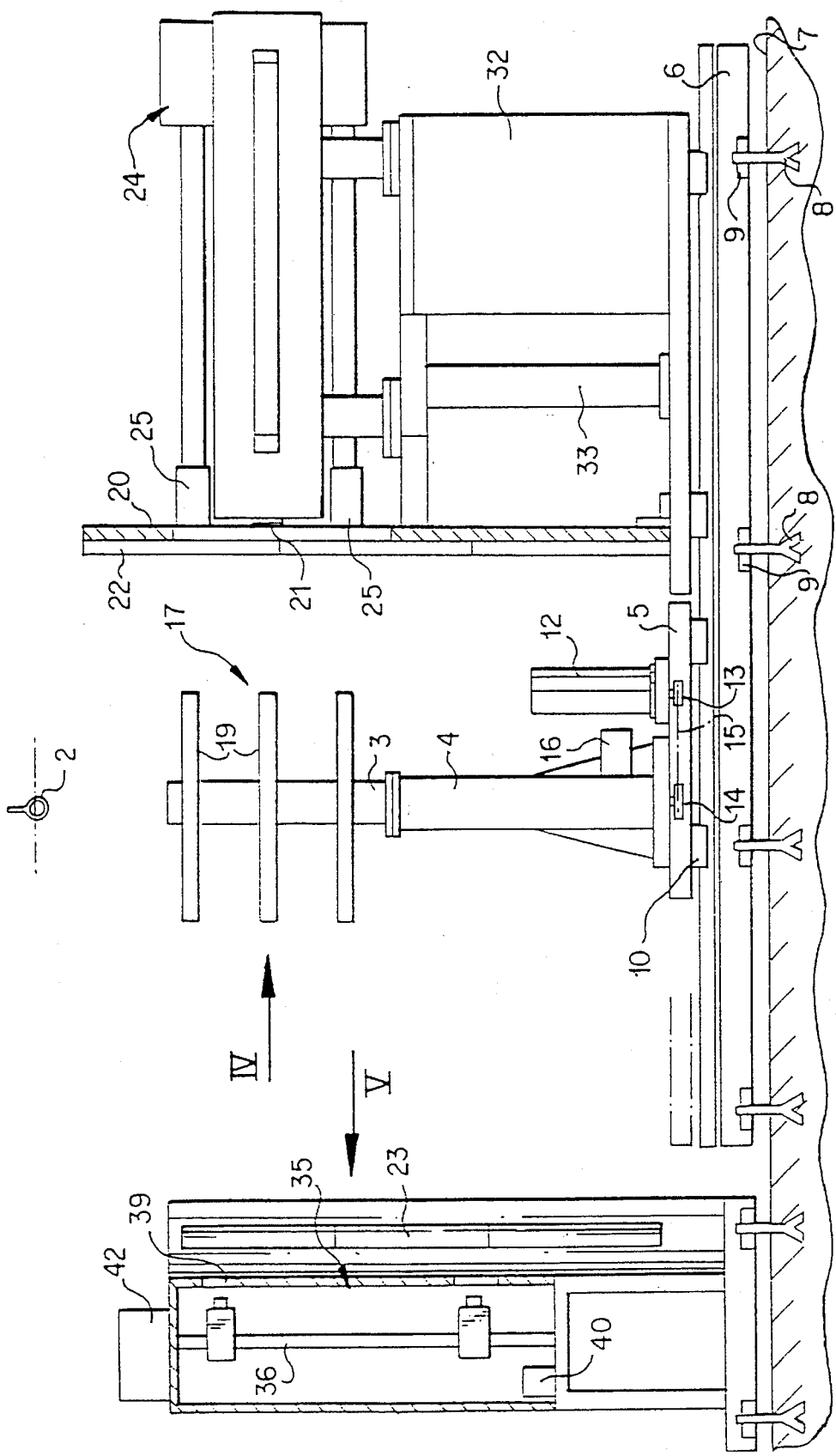
FIG. 1 is a side view thereof in partial section, viewed in the direction of travel of the sides of meat.
Figure 2:
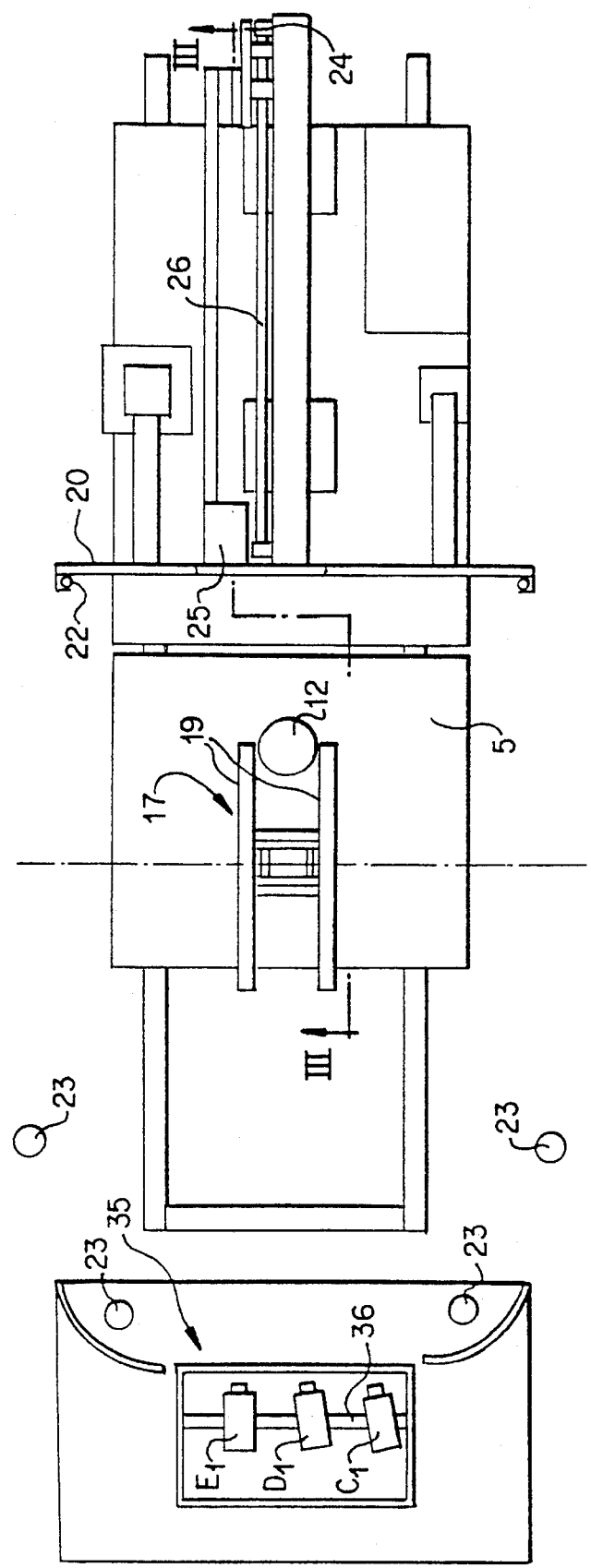
FIG. 2 is a view thereof from above.

The device according to the invention is intended to be inserted in an installation for processing carcasses, such as carcasses of large cattle which are cut longitudinally into two. These carcasses are moved with the aid of an overhead conveyor, from which the sides of meat are hung with the aid of hooks 2.

The device according to the invention comprises a vertical post 3, the axis of which passes through the axis of the conveyor from which the hooks 2 are suspended, and through the axis of the hook. This post 3 is mounted so that it can pivot inside a vertical barrel 4. This post is mounted on a chassis 5, itself located on a structure 6 fixed permanently to the ground 7 by means of sealing-in tabs 8 and bolts 9. The chassis 5 is mounted on the structure 6, for example by means of slideways or small rollers 10, so that it can be moved in order to be freed from the travel path of the sides of meat. The post 3 is driven in terms of rotation from an electric gear motor unit 12, the transmission of movements from the gear motor unit taking place by means of sprockets 13, 14 and a chain 15. The post is immobilized in terms of rotation by an indexing device 16, in the various chosen angular positions, and the angle of pivoting of the post is checked by an electronic encoder. The post 3 has two series of limit stops 17 which are diametrically opposite each other. Each limit stop comprises a support 18 forming a spacer piece, mounted directly on the post 3, which has a tube 19 against which the side of meat is intended to bear.

Figure 4:
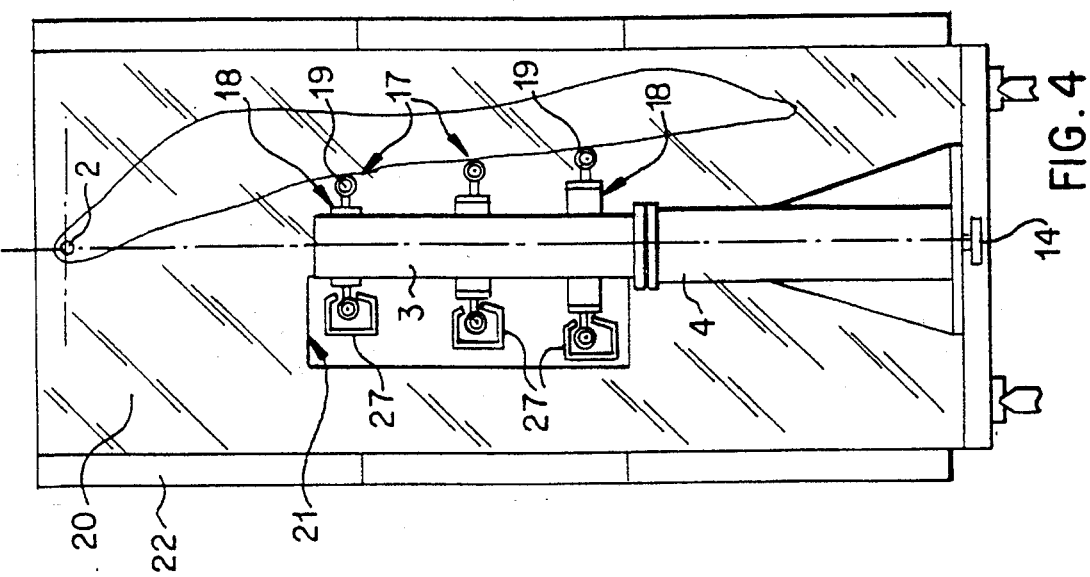
FIG. 4 is a front view of the luminous background in the direction of the arrow 4 of FIG. 1.
Figure 3:
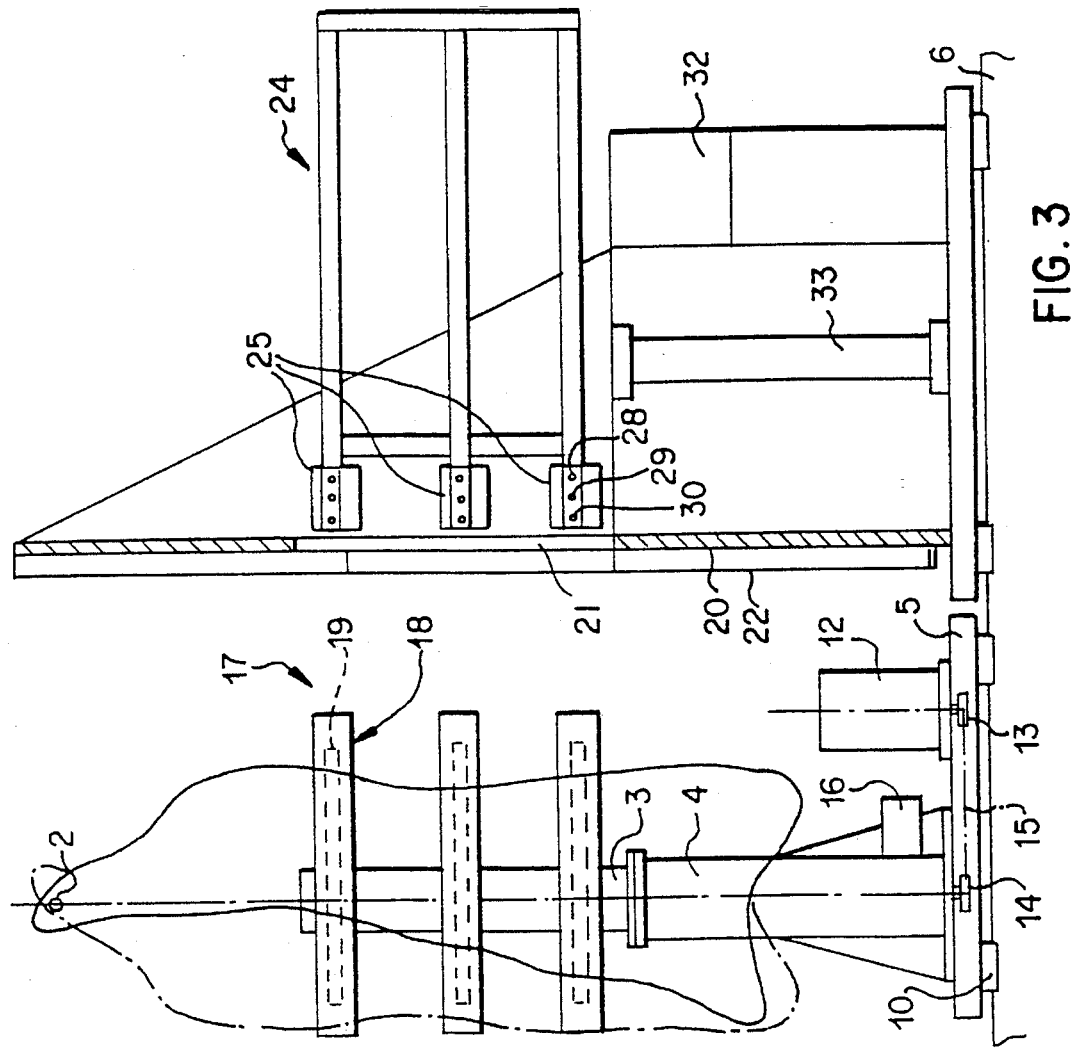
FIG. 3 is a view in transverse section on the line III—III of FIG. 2 of the limit stop device and of the device for washing the limit stops.
Figure 6:
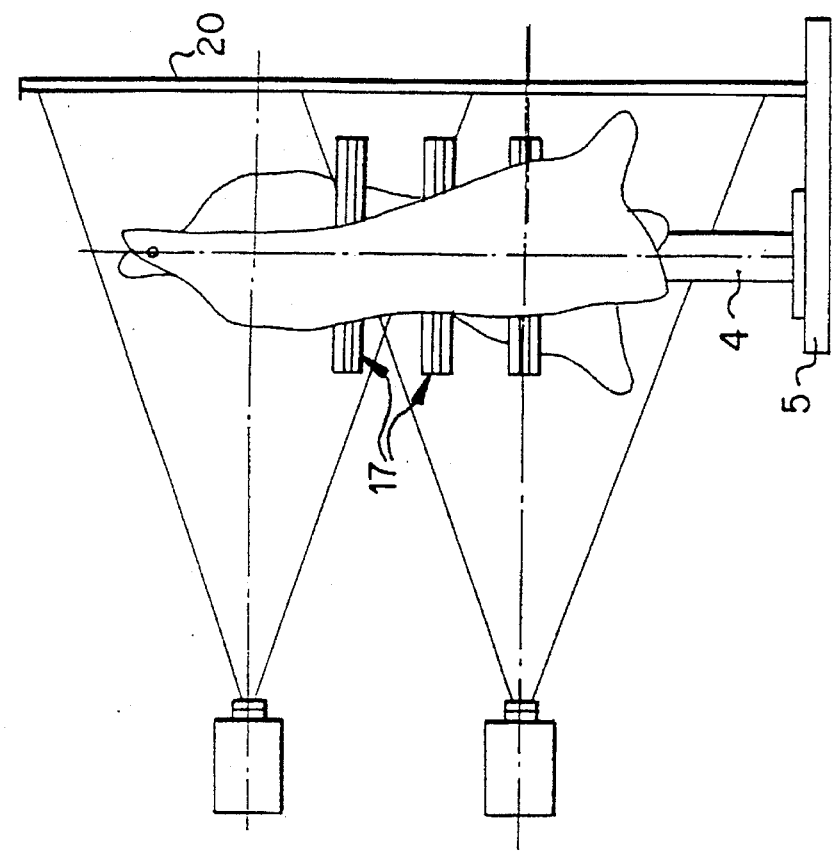
FIG. 6 is a side view showing the field of the cameras.
Figure 5:
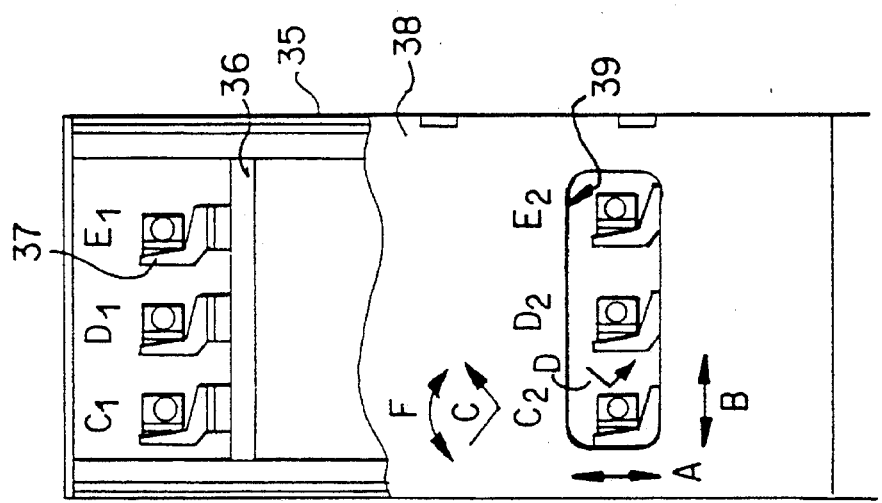
FIG. 5 is a front view of the cabinet containing the cameras in the direction of the arrow 5 of FIG. 1.

As shown particularly in FIG. 4, the supports 18 are of variable thickness, this thickness increasing from the support of the uppermost limit stop as far as the support of the lowermost limit stop.

However, the three tubes 19 are situated in one and the same plane inclined downward and from the inside of the post toward the outside of the latter, in order to make sure that the carcass bears perfectly during the taking of shots, as shown in FIG. 4. The supports 18 forming spacer pieces may be changed in order to modify this inclination, and the supports 18 may be adjusted in terms of height on the post in order to allow one and the same device to be used for sides of meat of very different sizes from each other, and to be adapted to the populations of carcasses processed in slaughterhouses.

In practice, the sides of meat hanging from hooks 2 are transferred to the station for taking shots, each side of meat bearing against the limit stops 17 which are in a position perpendicular to the direction of the transfer. The post is then driven in terms of rotation in order to cause the carcass to occupy various angular positions during which shots are taken.

This device also comprises a luminous or contrasting background possessing a support framework, not detailed in the drawing, to which the background 20 proper is fixed, which background is made up of a vertical plane surface, as shown in the drawing, or which could be made up of several superimposed surfaces parallel to each other and forming a slight angle with respect to the vertical. The background 20 is of a light color, for example white, insofar as it is associated with background lighting with the aid of lamps 22 located on the perimeter of the structure. In contrast, the background 20 is dark, for example black, insofar as it is associated with outside lighting made up, for example, of lamps 23 located on the same side as the cameras for taking shots. In its central part, the background has an opening 21, possibly one which can be closed off, intended to allow the heads for washing the limit stops 17 to pass through it.

The washing device is installed behind the background and is used to wash the two series of limit stops alternately, the washing being carried out on the series of limit stops located downstream in the direction of travel of the device for transporting the sides of meat.

This device comprises a support 24 for three washing heads 25, positioned vertically at the same height as the three limit stops 17. This support can be moved transversely to the direction of travel of the sides of meat, being guided on posts 26, and moved with the aid of a pneumatic ram which is not represented in the drawing. The support can be moved between a recoiled position in which the assembly is retracted behind the luminous background 20, and a position in which the washing heads are located at the end of the limit stops situated on the side opposite the background 20. Each washing head 25 comprises a casing 27 having a slit tubular shape in order to be able to engage around each limit stop, whilst allowing the passage of the supports 18.

Inside the casing 27 of each head 25, there emerge three nozzles intended respectively to spray hot water, in the case of the nozzle 28, steam, in the case of the nozzle 29, and air, in the case of the nozzle 30. The hot water is between 50° C. and 90° C. under a pressure of 3 bar, the steam is at 140° C. under a pressure of 3 bar and the air is under a pressure of 6 bar. The supply of the nozzles takes place by means of pipes mounted inside the sections which make up the support 24, and distribution is ensured from a control cabinet 32, so that during the outward movement of the heads there is a spraying of steam for disinfection, and hot water for washing, and during the return movement the three nozzles spray hot water, steam and air for drying and cooling.

During the washing operation, the water and steam do not come into contact with the meat of the side of meat bearing against the upstream limit stops, owing to the protection by the casing 27, which also ensures evacuation of water and waste. In the position of rest behind the background 20, the washing heads may be sheltered by a protective flap which is not represented in the drawing.

The assembly of the washing system and of the luminous background is mounted on a chassis 33 fixed removably to the structure 6 common to the chassis 5 of the post 3 carrying the limit stops 17.

On the other side of the conveyor is located a cabinet 35 containing the cameras. Inside this cabinet there is mounted a structure 36 for fixing camera supports 37. The cameras are located at two levels and referenced C1, D1 and E1 for those of the upper level and C2, D2 and E2 for those of the lower level. The cabinet is closed off by a door 38 exhibiting transparent windows 39 facing the cameras. The camera supports can move vertically and are capable of a certain number of adjustments, vertical travel A, horizontal travel B, rotation in a horizontal plane C, rotation in a vertical plane D, inclination F.

The vertical and horizontal adjustments are carried out by manual travel and manual immobilization. The rotational adjustments over a range of plus or minus 60° are carried out by manual approximation then micrometric fine adjustment.

The cameras C may be used for measuring the length of the sides of meat, in order to take shots of the external and internal faces of the sides of meat for the whole of the sides of meat, whereas the cameras D and E are intended to take shots of the sides of meat at certain chosen angles, at the leg, the loin and the shoulder.

In order to prevent any risk of condensation inside the cabinet 35 containing the cameras, this cabinet is equipped with a heating device 40, which may be supplemented by an air conditioner 42, located above the cabinet.

This device also comprises a transfer mechanism adapted, for each machine, as a function of the organization of the slaughterhouse. This mechanism demands three halts facing each station: standby, weighing, taking of shots.

This mechanism comprises a system for checking the positioning of the sides of meat, and two systems for checking the presence of the sides of meat.

Before entering the machine, the sides of meat are prepositioned manually by an operator on the last work station of the line. They are systematically prepositioned so that the sides corresponding to the cutting of the two sides of meat from one and the same animal face each other, substantially perpendicular to the direction of transfer, with an accuracy of plus or minus 30°. These positions are checked by a proximity detector installed at the hanging hook. The incorrect positions are signalled by a visual or acoustic signal.

The systems for checking the presence of the sides of meat are installed at the weighing station and at the station for taking shots. The checking devices are installed close to the hanging hook, and detection is based on the presence or absence of the sides of meat. An indexing device at the hanging hook is provided at the weighing station and at the station for taking shots in order to ensure perfect positioning of the sides of meat at these two stations.

FIGS. 7 to 14 represent eight diagrammatic views of an operating cycle of the device given hereafter by way of example. These stations I, II and III correspond respectively to the stations of positioning sides of meat, weighing, and taking shots.

The device for advancing the sides of meat is a stepwise advancement device, the step corresponding to the distance between the stations I and II, and II and III respectively.

In FIG. 7, limit stops are perpendicular to the direction of travel of the conveyor, the limit stops located downstream are being washed. The foremost side of meat A arrives against the limit stops situated upstream, and its hanging hook is indexed, whereas the corresponding side of meat A' is weighed.

In FIG. 8, the limit stop has been freed, has pivoted through 90° in order to exhibit the cut face toward the cameras, the carcass has been lit by the lights 23, its length has been measured by the camera C2, and the cameras C1 and C2 have taken shots of the inside of the carcass.

As shown in FIG. 9, the post carrying the limit stops is then rotated through 90°, the limit stop is immobilized after indexing and the transfer device has been switched on and advances by one step in order to evacuate the side of meat A and bring the side of meat A', which is the left-hand side of meat, against the limit stops.

As shown in FIG. 10, the limit stops located downstream are then washed, the side of meat B is weighed, and the hook from which this side of meat is hung is indexed.

Figure 11:
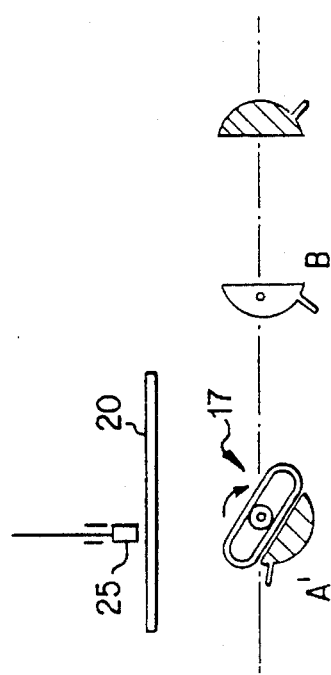

As shown in FIG. 11, the post carrying the limit stops is then freed, this post is rotated through 90°, the length is measured and the shots of the outside of the carcass are taken with the aid of the cameras C1 and C2.

Figure 12:
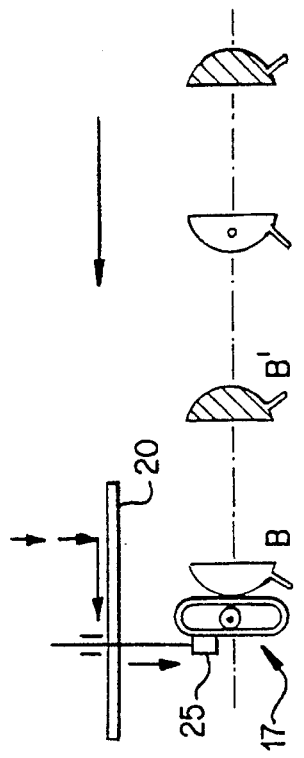

Next, as shown in FIG. 12, the post is pivoted in the clockwise direction through an angle of approximately 40° before shots are taken using the cameras D1 and D2.

Figure 13:
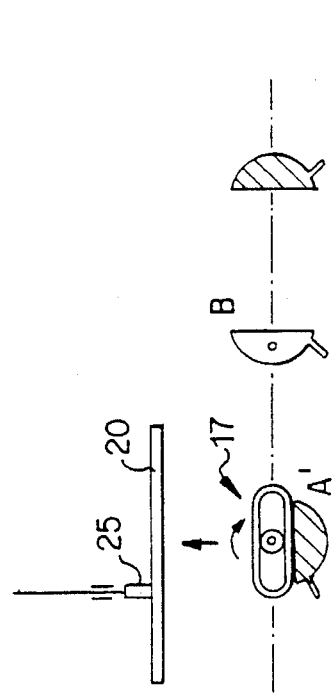

As shown in FIG. 13, the rotation continues until it reaches 180° with respect to the starting position, the post is immobilized in this position with return of indexing, shots are then taken with the aid of the cameras E1 and E2. The transfer device is actuated by one step in order to evacuate the side of meat A' corresponding to the arrival of a side of meat B onto the upstream limit stops.

Figure 14:
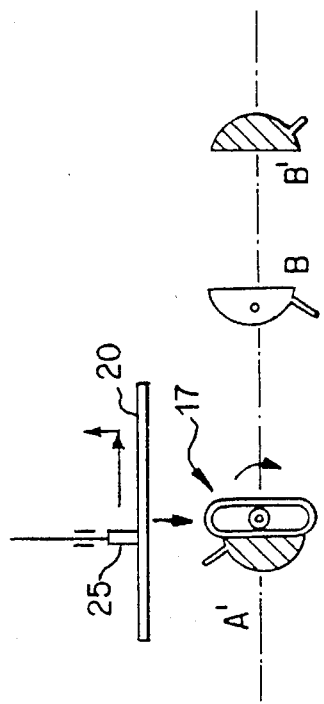

FIG. 14 corresponds to the start of a new cycle, identical to the situation in FIG. 7.

The sequences which have been defined hereinabove are examples of shots, it being emphasized that it is possible to multiply the number of shots on each side of meat.

As emerges from the foregoing, the invention provides a great improvement to the existing art by providing a device of simple design and production, exhibiting high reliability and perfect hygiene in use.

As goes without saying, the invention is not limited just to that embodiment of this device, or just to that implementation thereof described above by way of examples, but in contrast encompasses all variants thereof.

We claim:

1. A device for classifying carcasses of large cattle, calves, hogs or sheep, comprising: a system, against which a side of meat suspended from a conveyor of a slaughterhouse line bears, for orientating the side of meat about a hanging point of the meat; a system, located on one side of the conveyor, for recording images of the side of meat, a contrasting background situated facing the system for recording images, on the opposite side of the conveyor; a system for processing the images; and a control system, wherein the system against which each side of meat bears comprises a vertical post, the axis of which passes through the axis of a hook of the conveyor, the post being rotatably driven by a gear motor unit and associated with a mechanism for indexing the angular position of the post; the post having two series of bearing limit stops for the side of meat diametrically opposite each other, each limit stop including a support fixed to the post used for mounting a horizontal bar forming the limit stop.

2. The device as claimed in claim 1, wherein the supports for the limit stops situated on one and the same side of the post are of variable thickness, the uppermost limit stop being situated closer to the post than the lowermost limit stop, these various limit stops defining a plane which is inclined downward from the post toward the outside of the latter.

3. The device as claimed in claim 1, wherein the limit stop supports are mounted on the post so that they can be adjusted vertically.

4. The device as claimed in claim 1, wherein at least some of the bars forming limit stops are made up of two sections articulated about a vertical axis midway along the bar and associated with a motorizing system allowing them to pivot between a position in which the bar is straight and a position in which the bar forms a V.

5. The device as claimed in claim 1, wherein the assembly including the vertical post and its drive system is mounted on a chassis fixed in a removable fashion to a support structure sealed into the ground.

6. The device as claimed in claim 1, wherein it comprises a background made up of a panel of light color lit by lamps mounted behind covers located along the panel.

7. The device as claimed in claim 1, wherein it comprises a background made up of a panel of dark color lit from the outside by lamps situated on the same side as the system for recording images.

8. The device as claimed in claim 6, wherein the panel forming the background is made up of a continuous surface.

9. The device as claimed in claim 6, wherein the panel forming the background is made up of several superimposed surfaces which are parallel and inclined with respect to the vertical, and which are possibly positioned with an angle with respect to the slaughterhouse line so that they are located as orthogonally as possible with respect to the system for recording images.

10. The device as claimed in claim 6, wherein the panel comprises an opening, possibly one which can be closed off, intended to allow a system for washing the limit stops to pass through it.

11. The device as claimed in claim 10, wherein it comprises a system for washing the limit stops, having as many washing heads as there are limit stops on one side of the post, these heads being mounted offset vertically on one and the same support, which can itself move transversely to the conveyor so that each head travels along a limit stop which is situated, with respect to the post, on the opposite side from the side by which the sides of meat arrive, each head being equipped with three nozzles which, being axially offset and used respectively for supplying hot water, steam and air, are housed inside a longitudinally slit tubular casing intended to engage over a limit stop during the cleaning of the latter.

12. The device as claimed in claim 11, wherein the hot water is at a temperature of 50° C. to 90° C. at a pressure of 3 bar, the steam is at 140° C. at a pressure of 3 bar, and the air is at a pressure of 6 bar.

13. The device as claimed in claim 11, wherein the cabinet for controlling the supply of the nozzles supplies, during the "outward" travel of each head, the steamnozzle, the hot water nozzle and possibly the air nozzle, and during the "return" travel of this head supplies the hot water nozzle, the steam nozzle and the air nozzle.

14. The device as claimed in claim 11, wherein the support for the washing heads is mounted guided in terms of translation on horizontal posts and capable of being moved with the aid of a pneumatic ram.

15. The device as claimed in claim 1, wherein the system for recording images includes cameras that are located inside a cabinet including a structure used for mounting camera supports, this cabinet being equipped with a door provided with transparent windows facing the cameras, containing a heating system and possibly an air conditioner.

16. The device as claimed in claim 1, wherein it includes means for checking the positioning of the sides of meat at the entrance to the assembly for recording images, these means being made up of a proximity detector installed in proximity to the path of the hooks from which the sides of meat are hung and detecting the orientation of these sides of meat.

17. The device as claimed in claim 1, wherein it comprises means for indexing the conveyor of the sides of meat, ensuring accurate positioning of each side of meat at the station for recording images.

* * * * *